(12) United States Patent
Arguello

(10) Patent No.: US 9,230,246 B1
(45) Date of Patent: Jan. 5, 2016

(54) SYSTEMS AND METHODS FOR ELECTRONIC DOCUMENT DELIVERY, EXECUTION, AND RETURN

(71) Applicant: United Services Automobile Association (USAA), San Antonio, TX (US)

(72) Inventor: Miguel A. Arguello, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 14/199,728

(22) Filed: Mar. 6, 2014

Related U.S. Application Data

(63) Continuation of application No. 13/653,032, filed on Oct. 16, 2012, now Pat. No. 8,708,225, which is a continuation of application No. 13/329,856, filed on Dec. 19, 2011, now Pat. No. 8,286,859, which is a continuation of application No. 12/194,174, filed on Aug. 19, 2008, now Pat. No. 8,083,129.

(51) Int. Cl.
*G06F 17/00* (2006.01)
*G06Q 10/10* (2012.01)

(52) U.S. Cl.
CPC ................... *G06Q 10/107* (2013.01)

(58) Field of Classification Search
USPC .............. 235/375, 487, 376; 705/80, 76
See application file for complete search history.

(56) References Cited

U.S. PATENT DOCUMENTS

| 7,334,184 | B1 * | 2/2008 | Simons ..................... 715/234 |
| 7,934,098 | B1 * | 4/2011 | Hahn et al. ................ 713/176 |
| 2006/0074719 | A1 * | 4/2006 | Horner ........................ 705/3 |
| 2007/0056035 | A1 * | 3/2007 | Copley ....................... 726/22 |
| 2007/0088846 | A1 * | 4/2007 | Adams et al. .............. 709/237 |
| 2008/0028455 | A1 * | 1/2008 | Hatter et al. ................ 726/10 |
| 2008/0052722 | A1 * | 2/2008 | Tokunaga .................. 718/105 |
| 2010/0217996 | A1 * | 8/2010 | Ross et al. ................. 713/179 |
| 2013/0318354 | A1 * | 11/2013 | Entschew et al. .......... 713/175 |

\* cited by examiner

*Primary Examiner* — Edwyn Labaze
(74) *Attorney, Agent, or Firm* — Baker & Hostetler LLP

(57) ABSTRACT

To expedite electronic delivery and return of a document, the document is sent to an electronic mail system and stored in an electronic form thereat. The recipient is informed that the document is available thereto at any of a plurality of merchants where the document may be retrieved. The recipient visits one of the plurality of merchants and at the visited merchant retrieves the document in the electronic form from the mail system to a computing device at the visited merchant. The recipient then reviews and executes the document at the visited merchant, and sends the executed document in an electronic form to the organization by way of the visited merchant and the computing device thereat.

20 Claims, 3 Drawing Sheets

SYSTEMS AND METHODS FOR ELECTRONIC DOCUMENT DELIVERY, EXECUTION, AND RETURN

CROSS-REFERENCE TO RELATED APPLICATION(S)

This application is a continuation of U.S. patent application Ser. No. 13/329,856, filed Dec. 19, 2011, now U.S. Pat. No. 8,286,859, which is a continuation of U.S. patent application Ser. No. 12/194,174, filed on Aug. 19, 2008, now U.S. Pat. No. 8,083,129. This application is also related in subject matter to, and incorporates herein by reference in its entirety, each of the following: U.S. patent application Ser. No. 12/194,185, filed on Aug. 19, 2008; and U.S. patent application Ser. No. 12/194,201, filed on Aug. 19, 2008.

FIELD

The present disclosure is directed to systems and methods that deliver documents from an originator to a recipient in an electronic manner, effectuate execution of the documents, and return the executed documents. In particular, the present disclosure relates to delivery of documents by way of a document processing merchant that also performs document-related services for the recipient and returns the documents on behalf of the recipient, all in an electronic manner.

BACKGROUND

In a typical scenario, an organization such as a business may wish to send one or more documents to a recipient in an especially time-sensitive manner. For example, the documents may relate to a transaction between the organization and the recipient where time is of the essence, where the time frame within which action must be taken is relatively short, or the like. In any case, the documents must be delivered to the recipient in an expeditious manner. Accordingly, the organization may print the documents for the recipient, place the documents in an appropriate delivery package, and then deposit the packaged documents with an expedited delivery carrier that then proceeds to deliver the packaged documents to the recipient in the expedited manner.

Typically, the expedited delivery carrier is one of several large and known carriers that specialize in the expedited delivery of packages, and may in fact have developed a large and sophisticated physical plant to effectuate such expedited delivery. For example, the carrier may be the FedEx Corporation of Memphis Tenn. or the United Parcel Service (UPS), Inc. of Greenwich Connecticut, and may have a vast network of sorting facilities, transferring facilities, pickup vehicles, delivery vehicles and even aircraft. However, even with such an expedited carrier service, the packaged documents are at best typically delivered into the hand of the recipient on an overnight basis. In at least some instances, such overnight delivery is not fast enough for purposes of the organization and/or the recipient.

Moreover, even with the use of such an expedited delivery carrier, the organization still is required to maintain facilities both to print the documents and to package same in a form amenable to the carrier. Particularly if the organization has a relatively high volume of such documents that are to be delivered to a multitude of recipients, the cost of such facilities can be quite significant, as can the cost charged by the carrier to deliver all of the packaged documents to all of the recipients thereof.

Notably, even when packaged documents are delivered to a recipient, it is oftentimes the case that the recipient must take action with regard to the delivered documents and then return the documents to the organization. Usually, such action includes signing the documents, and perhaps even having the signed documents notarized. At any rate, taking such action can take precious time, for example if a notary public is not immediately available to notarize the signed documents, and once such action is taken, returning the documents to the organization can take even more precious time, even if an expedited delivery carrier is employed to effectuate such return on an overnight basis.

Of course, in the present electronic age the organization may deliver the documents electronically to the recipient, perhaps by way of electronic mail or electronic facsimile. The recipient may then take at least some actions with respect to the delivered documents and immediately return same electronically to the organization, again perhaps by way of electronic mail or electronic facsimile. For example, if signing is required, the recipient may print and sign the documents and then return the signed documents. However, the recipient may not have the necessary systems and functionality available thereto to receive and return the documents electronically. Moreover, and perhaps critically, other actions such as the aforementioned notarizing may require an undesirable delay in the return of the documents, especially if a notary public is not immediately available to the recipient.

Accordingly, a need exists for an electronic document delivery system that delivers documents from an organization to a recipient and that receives the documents as executed or the like from the recipient in an expedited manner.

SUMMARY

The aforementioned needs are satisfied at least in part by systems and methods employed to expedite electronic delivery and return of a document. The document is sent to an electronic mail system to be received by a recipient, where the document as sent is stored in an electronic form. The recipient is informed that the document is available thereto at any of a plurality of merchants where the document may be retrieved. The recipient visits one of the plurality of merchants and at the visited merchant retrieves the document in the electronic form from the mail system to a computing device at the visited merchant. The recipient then reviews and executes the document at the visited merchant, and sends the executed electronic document to the organization by way of the visited merchant and the computing device thereat.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
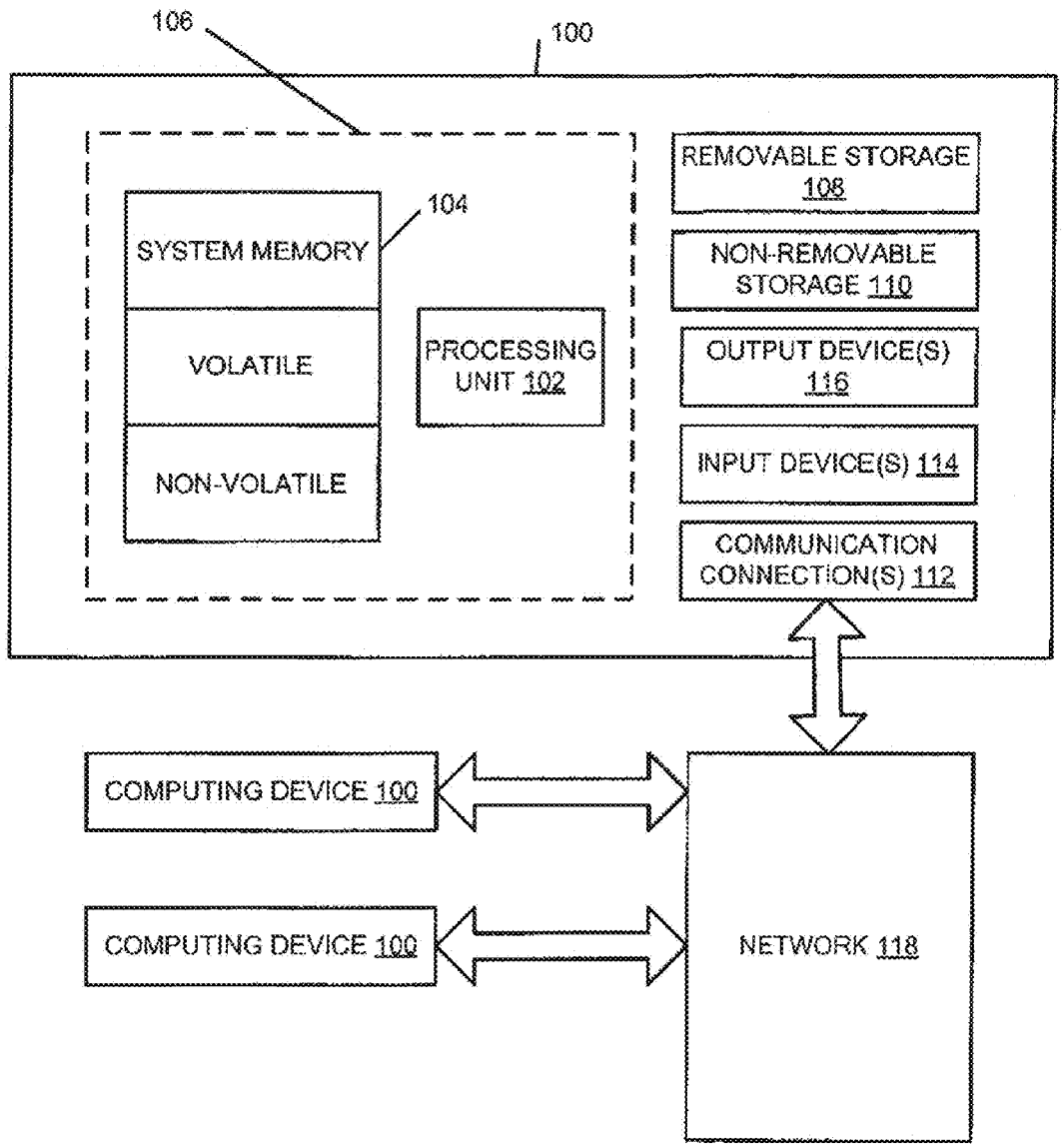
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Electronic Document Delivery System

Figure 2:
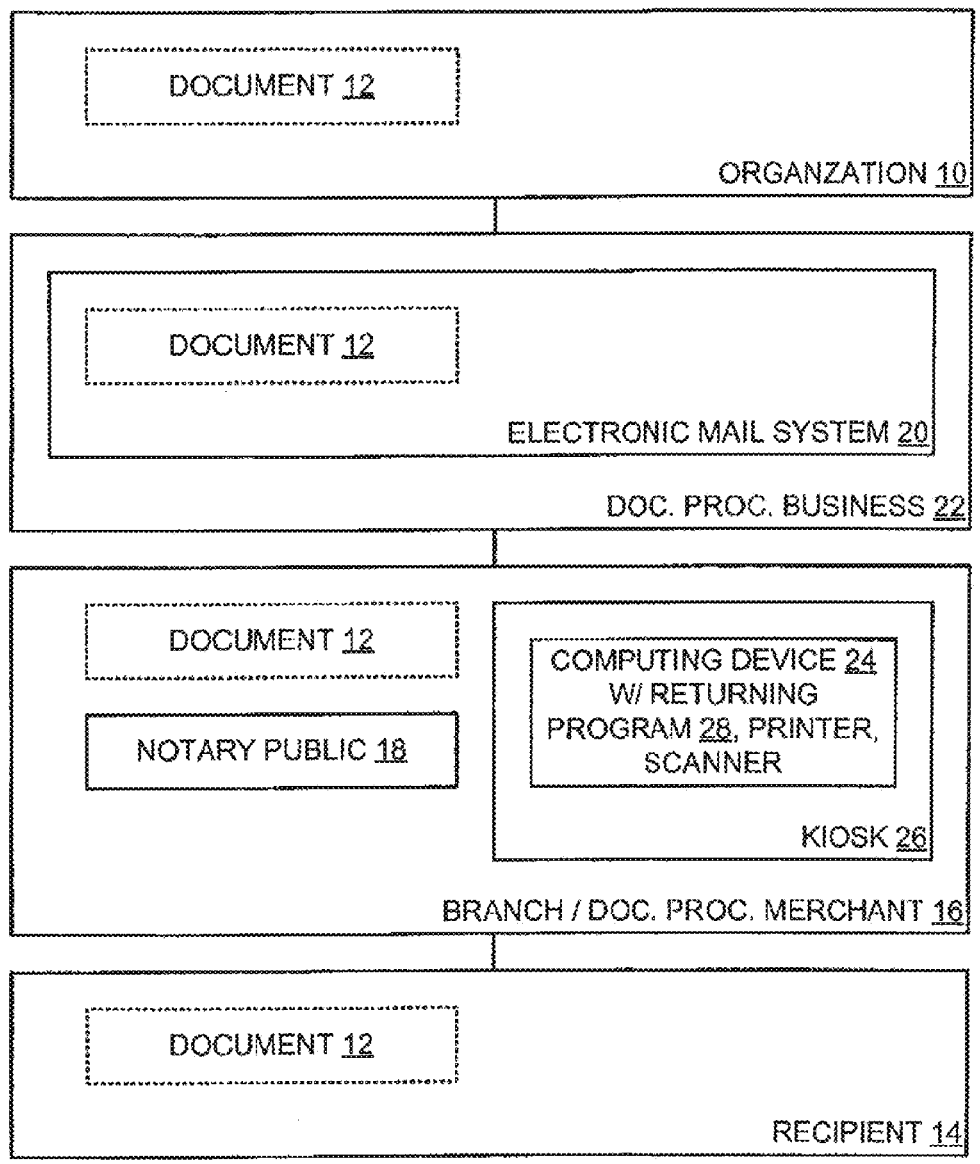
FIG. 2 is a block diagram of an electronic document delivery system including an organization sending a document to a recipient by way of a kiosk or the like at a merchant in accordance with various embodiments of the present innovation.

In various embodiments of the present innovation, and turning now to FIG. 2, an organization 10 such as a business wishes to send a document 12 to a recipient 14 in an especially time-sensitive manner. Here, the organization 10 may be most any organization, although typically the organization 10 would be a large organization that sends many documents 12 to recipients in the especially time-sensitive manner. For example, the organization 10 may be a banking or financial services organization or an insurance organization, among other things; the recipient 14 may be a customer of the organization 10, among other things; and the document 12 may relate to a transaction being effectuated between the organization 10 and the recipient 14.

Typically, although by no means necessarily, if the document 12 is especially time-sensitive, then the transaction between the organization 10 and the recipient 14 is of some importance, such as for example a transaction to effectuate a mortgage or other loan, a transaction to effectuate a life insurance policy or other insurance policy, a transaction to open a banking account or other account, etc. Correspondingly, based on the importance of the transaction, the document 12 as sent to the recipient 14 is to be signed and perhaps even notarized, and the signed and notarized document 12 is to be returned to the organization 10 for further processing. As should be understood, such notarizing typically involves a notary public 18 or the like witnessing the document 12 being signed or 'executed' by the recipient 14 and/or verifying the identity of the recipient 14, and then the notary public 18 in turn executing a statement on the document 10 to that effect, although the notarizing may take other forms.

In various embodiments of the present innovation, the organization 10 does not print the document 12 for the recipient 14 and ship the printed document 12 to the recipient 14 by way of an expedited delivery carrier in the manner that was set forth above. Instead, the organization 10 delivers the document 12 electronically to the recipient 14 by way of a document processing merchant 16 that is relatively local to the recipient 14 and that has sufficient facilities to electronically receive the document 12 from the organization 10, print the received document 12 for the recipient 14, effectuate all necessary actions with respect to the document 12 by the recipient 14, and thereafter electronically return the document 12 to the organization 10.

As may be appreciated, to receive and return the document 12, the merchant 16 typically may employ an electronic mail system 20 that receives and transmits electronic mail from and to the organization 10 among other places. As set forth below, the mail system 20 may include additional features specific to delivery of the document 12 from the organization 10 of the recipient 14. As may also be appreciated, the necessary actions effectuated by the merchant 16 with respect to the document 12 may be most any appropriate actions, although such actions typically include allowing the recipient 14 to review and sign or execute the document 12, and perhaps providing a notary public 18 to notarize the signed or executed document 12. Thus, the merchant 16 is expected to have such a notary public 18 on staff or at least readily available.

In order that the document processing merchant 16 can be relatively local to the recipient 14, and bearing in mind that the recipient 14 may conceivably be located most anywhere, the merchant 16 may be a branch or the like of a document processing business 22 or the like that has sufficient numbers of such branches/merchants 16, at least in most major metropolitan areas. For example, the document processing business 22 may be a business such as FedEx Kinko's Office and Print Centers ('FedEx Office'), which is a subsidiary of the aforementioned FedEx Corporation, or The UPS Store or Mail Boxes, Etc. store, both of which are subsidiaries of the aforementioned United Parcel Service, Inc. Moreover, by employing such businesses 22, the organization 10 may leverage existing relationships with the related expedited delivery carriers.

Figure 3:
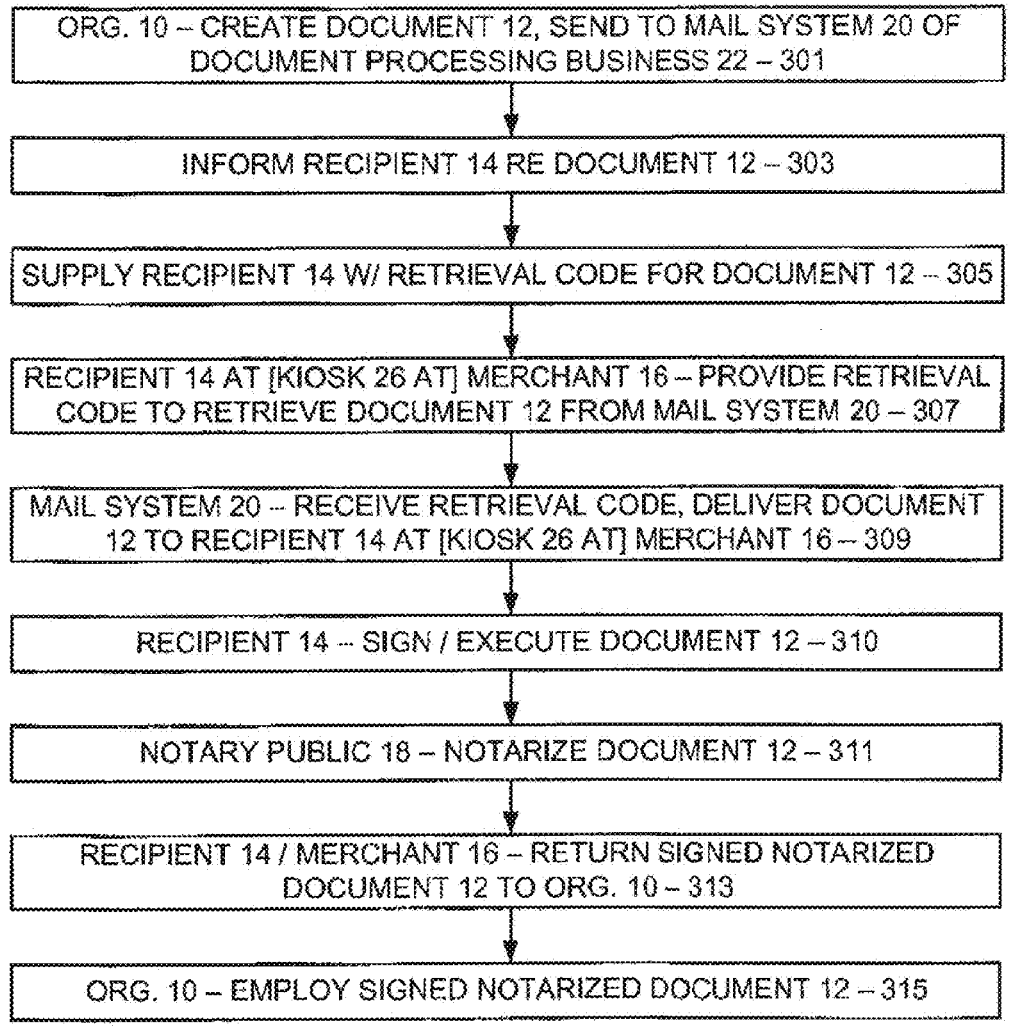
FIG. 3 is a flow diagram showing key actions performed in connection with the electronic document delivery system of FIG. 2 in accordance with various embodiments of the present innovation.

In various embodiments of the present innovation, and turning now to FIG. 3, it is seen that the organization 10 and the recipient 14 enter into a transaction in which it is necessary that the organization 10 sends a document 12 to the recipient 14 in an especially time-sensitive and/or expeditious manner. Accordingly, the organization 10 creates the document 12 in an appropriate electronic form and sends the document 12 in the electronic form to the electronic mail system 20 of the document processing business 22 by way of an inter-network connection therebetween such as the Internet (301). The electronic form may be as a regular email message with the document 12, or may be another form, and the another form may be specific to the mail system 20. Sending such document 12 to the mail system 20 and storing same thereat is known or should be apparent to the relevant public and therefore need not be set forth herein in any detail other that which is provided.

As should be understood, the mail system 20 is under the auspices of the business 22 and not any particular merchant 16 that is a branch of the business 22 so that the recipient 14 need not specify delivery of the document 12 to any particular branch/merchant 16. Instead, the recipient 14 is informed by the organization 10 that the document 12 is awaiting the recipient 14 and may be printed out at any branch/merchant 16 of the business 22 (303). Thus, the mail system 20 is akin to and in fact may include a spooler at which documents 12 are spooled and may be retrieved at any branch/merchant 16 of the business 22.

Note that each document 12 may contain confidential information, or at least information that should not be revealed publicly. Accordingly, to retrieve the document 12 from the mail system 20, and to provide some degree of confidentiality, the recipient is supplied by the organization 10 with a retrieval code that must be entered at the branch/merchant 16 to identify the document 12 and release same from the mail system 20 (305). Such retrieval code may be supplied by the organization 10 to the recipient 14 in any appropriate form, such as for example orally during a telephone conversation or by electronic mail, and at any appropriate time such as for example when the recipient 14 is notified that the document 12 is to be delivered thereto.

As should be understood, the retrieval code as supplied by the organization 10 to the recipient 14 as at 305 should also be supplied by the organization 10 to the mail system 20 when sending the document 12 in the electronic form to such mail system 20 as at 301. Accordingly, the mail system 20 can associate the retrieval code with the sent document 12, perhaps in a database or the like associated with such mail system 20, such that the retrieval code can be employed to retrieve the document 12 thereat. Note that the retrieval code may also be employed to encrypt and decrypt the document 12 at the mail system 20 if desired, or that such encrypting and decrypting may be performed in another manner if desired.

Thus, the recipient 14 with the retrieval code visits a local branch/merchant 16 of the business 22, and at such merchant 16 provides the retrieval code to retrieve the document 12 in the electronic form from the mail system 20 (307). Note here that the recipient 14 may supply the retrieval code to a clerk or the like at the merchant 16 and the clerk may then communicate the retrieval code to the mail system 20 of the business 22 by way of an appropriately networked computing device 24 at the merchant 16. Alternately, the recipient 14 may enter the retrieval code into the computing device 24 himself or herself, perhaps at a self-service kiosk 26 or the like at the merchant 16 dedicated to that function.

Upon receiving the retrieval code, the mail system 20 delivers the document 12 for the recipient 14 to such recipient 14 at the local merchant 16 (309). Delivering such document 12 from the mail system 20 to the local merchant 16 is known or should be apparent to the relevant public and therefore need not be set forth herein in any detail other that which is provided. Thus, the recipient 14 or clerk may print the delivered document 12 at the merchant 16 to review same, or the recipient 14 may review the document 12 in an electronic form, particularly if the recipient 14 is employing the computing device 24 at a kiosk 26.

As was set forth above, the recipient 14 may be expected to sign/execute the delivered document 12 and return same to the organization 10 (310). In addition, the executed document 12 may require notarization by a notary public 18 (311). If so, the delivered document 12 may be printed at a printer or the like at the kiosk 26 with the computing device 24, so that the recipient 14 can in fact sign/execute same and perhaps have the executed document 12 notarized by a notary public 18. Alternately, if feasible and permissible, the recipient can electronically sign/execute the delivered document 12 and perhaps have the executed document 12 notarized by a notary public 18.

As may be appreciated, such electronic signing/executing and notarizing may take any appropriate form. For example, the signing/executing and notarizing may be performed with a mouse or with an electronic stylus and tablet at the kiosk 26 at the merchant 16, and/or may involve the electronic presentation of one or more digital certificates and the performance of one or more digital signatures over the delivered document 12 based on cryptographic keys associated with the digital certificates. In any case, it is advisable that if a notary public 18 is required to notarize a document 12 at the merchant 16, such merchant 16 should have a notary public 18 on staff and readily available, or at least readily available.

Thereafter, the signed or signed and notarized document 12 is returned by the recipient 14 to the organization 10 in an electronic form by way of the merchant 16 (313). In particular, if printed out and signed, the document 12 may be scanned back into the electronic form at a scanner or the like at the kiosk 26 with the computing device 24, and the scanned document 12 in the electronic form is then appropriately transmitted from such computing device 24 either directly back to the organization 10 or indirectly back to the organization 10 by way of the mail system 20 of the business 22. In either case, such transmitting is known or should be apparent to the relevant public and therefore need not be set forth herein in any detail other than that which is provided. Alternately, if signed in the electronic form, scanning is not required and instead the signed document 12 in the electronic form is then appropriately transmitted from such computing device 24 either directly back to the organization 10 or indirectly back to the organization 10 by way of the mail system 20 of the business 22. In either case, the organization 10 may then employ the signed or signed and notarized document 12 as necessary and/or appropriate (315).

Note here that the merchant 16 and/or the business 22 rightly should expect some payment for the services provided thereby to the recipient 14, including receiving the document 12 from the organization 10, printing the document 12, notarizing the document 12, scanning the document 12, returning the document 12 to the organization 10, and/or the like as may variously be performed. Such payment may be made by the organization 10 or the recipient 14, as should be understood. In either case, inasmuch as the organization 10 may expect to deliver a large number of documents 12 to recipients 14 by way of the branches/merchants 16 of the business 22, the organization 10 should be able to negotiate a favorable payment rate with the merchants 16/business 22 for doing so, where the payment rate covers all necessary services in connection with the actions of FIG. 3.

In various embodiments of the present innovation, each kiosk 26 at a merchant 16 is organized to effectuate the actions of FIG. 3 in a generally smooth and simple manner, at least as experienced by a recipient 14 employing such kiosk 26. Accordingly, the computing device 24 at the kiosk 26 should employ an interface that easily guides the recipient through the use of such kiosk 26, including entering the retrieval code, reviewing the retrieved document 12 in electronic form, printing and scanning the document 12 as may be performed, signing/executing the document 12 in electronic or paper form, notarizing the document 12 in electronic or paper form, and returning the document 12 to the organization, among other things. Such an interface is known or should be apparent to the relevant public and therefore need not be set forth herein in any detail. Accordingly, any appropriate interface may be employed.

Note too that the use of a kiosk 26 having a computing device 24 at each of several branches/merchants 16 of a business 22 may require a significant investment of capital to install and maintain all of such kiosks 26, especially if the number of branches/merchants 16 of the business 22 is on the order of hundreds or thousands. While the organization 10 might be expected to contribute such capital, the business 22 may discover that the capital for such kiosks 26 can be derived solely from payments made in connection with the use thereof while still leaving a significant profit. Moreover, the business 22 may discover that by hosting such kiosks 26 in the branches/merchants 16 thereof, significant numbers of people may visit the merchants 16 that would not otherwise do so, and such significant numbers of people may in the course of such visits purchase additional products and services of the merchants 16 that have significant value. Accordingly, such kiosks 26 may be treated as loss leaders or the like if found to lead to additional purchases at the merchants 16.

In various embodiments of the present innovation, the computing device 25 at the kiosk 26 employs a returning program 28 to return the document 12 in the electronic form to the organization 10. As should be understood, such a returning program 28 may be accessed directly or may be accessed indirectly, for example as a pseudo-printer driver that does not actually print the returning document 12 but instead appropriately formats and sends the returning document 12 in the electronic form to the organization 10. In any case, the use of the returning program ensures that the returning document 12 is sent to the correct location, such as for example a central delivery address at the organization 10, perhaps by having such location encoded therein or by having encoded therein a pointer to the correct location.

Also, the use of the returning program 28 allows the returning document 12 to be marked with information that will allow the returned document 12 to be routed to the correct location within the organization 10, especially if such information is not already present in the document 12. For example, the returning program 28 may be required to query the recipient for a name and identification number thereof and perhaps an appropriate contact within the organization, all of which is placed on the returning document 12 in an appropriate manner, perhaps as a watermark or as printing in a margin, or even as a cover sheet appended to the document 12. Additionally, the use of the returning program 28 allows for encrypting the returning document 12 if need be, and/or sending the returning document 12 according to a particular secure delivery mechanism.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods provide an electronic document delivery system that delivers documents 12 from an organization 10 to a recipient 14 and that receives the documents 12 as executed or the like from the recipient in an expeditious manner, especially where an action that must be taken with respect to the document 12 cannot be performed by the recipient 14, such as notarizing. The electronic delivery system delivers the document 12 to a document processing merchant 16 or the like who can print the document 12, perform the action that cannot be taken by the recipient 14, and then return the document 12 to the organization 10 on behalf of the recipient 14.

Such an electronic delivery system minimizes the need for an expedited delivery carrier to deliver the document 12 to the recipient 14 and back, and also minimizes the facilities that the organization 10 must maintain both to print the documents and to package same in a form amenable to the carrier. Particularly if the organization 10 has a relatively high volume of such documents 12 that are to be delivered to a multitude of recipients 14, the savings from the electronic delivery system can be quite significant, as can the savings from the costs charged by the carrier to deliver all of such packaged documents to all of the recipients thereof.

With a kiosk 26 at a merchant 16 that effectuates all actions with respect to a document 12 electronically delivered to a recipient 14 thereat, such actions are performed quickly and efficiently, perhaps in as little as a few minutes, and the document 12 is then quickly returned to the organization 10 in an electronic form. Especially when a document 12 delivered to a recipient 14 requires special action that the recipient cannot take, such as notarizing, the kiosk 26 and the merchant 16 can establish mechanisms for effectuating such a special action, such as for example ensuring that a notary public 18 is readily available. Such a kiosk 26 is also particularly useful to a recipient 14 that does not have the necessary systems and functionality available thereto to receive and return the document 12 electronically.

It should be appreciated that changes could be made to the embodiments described above without departing from the innovative concepts thereof. For example, although the present innovation is set forth primarily in terms of a mail system 20 at the business 22, such mail system 20 may be established instead directly at a merchant 16, or even within the organization 10. Likewise, although the present innovation is set forth primarily in terms of the merchant 16 being a document processing merchant, such merchant 16 may instead be an individual, such as for example a notary public 18 or a paralegal or attorney. It should be understood, therefore, that this innovation is not limited to the particular embodiments disclosed, but it is intended to cover modifications within the spirit and scope of the present innovation as defined by the appended claims.

What is claimed is:

1. A method employed by an organization to expedite electronic delivery and return of a document, the method comprising:

sending a document to be received by a recipient to an electronic mail system, where the document as sent is stored in an electronic form, informing the recipient that the document is available to the recipient at any of a plurality of merchants where the document may be retrieved; and receiving the document in an electronic form and in an executed form from the recipient upon the recipient visiting one of the plurality of merchants and at the visited merchant retrieving the document in the electronic form from the mail system to a computing device at the visited merchant, and reviewing and executing the document at the visited merchant, the executed document in an electronic form being received from the recipient by way of the visited merchant and the computing device thereat, wherein the electronic executed document is received from the computing device by way of a returning program employed on the computing device to return the executed document to the organization in the electronic form, the returning program marking the returning document with routing information.

2. The method of claim 1 wherein the mail system is operated by a document processing business having the plurality of merchants as branches thereof.

3. The method of claim 1 wherein the document is stored at the mail system according to a retrieval code, and wherein the organization supplies the retrieval code to the recipient, the recipient entering the supplied retrieval code at the computing device at the visited merchant to identify the document at the mail system and retrieve the document from the mail system.

4. The method of claim 1 wherein the electronic executed document is received from the computing device at the visited merchant at a self-service kiosk that the recipient employs and that is dedicated to retrieving the document for the recipient and returning the electronic executed document to the organization.

5. The method of claim 1 wherein the organization pays the visited merchant according to a predetermined arrangement therebetween for all services rendered to the recipient by the visited merchant in connection with the document.

6. The method of claim 1, wherein the electronic executed document is received from the computing device by way of a returning program employed on the computing device to return the executed document to the organization in the electronic form, the returning program ensuring that the returning document is sent to the organization correctly and marking the returning document with information that allows the returned document to be routed correctly within the organization.

7. The method of claim 1 wherein the electronic mail system includes a spooler where the document is spooled.

8. A non-transitory computer-readable storage medium having computer-executable
instructions thereon implementing a method employed by an organization to expedite electronic delivery and return of a document, the method comprising:
sending a document to be received by a recipient to an electronic mail system, where the document as sent is stored in an electronic form;
informing the recipient that the document is available to the recipient at any of a plurality of merchants where the document may be retrieved; and
receiving the document in an electronic form and in an executed form from the recipient upon the recipient visiting one of the plurality of merchants and at the visited merchant retrieving the document in the electronic form from the mail system to a computing device at the visited merchant, and reviewing and executing the document at the visited merchant, the executed electronic document in an electronic form being received from the recipient by way of the visited merchant and the computing device thereat, wherein the electronic executed document is received from the computing device by way of a returning program employed on the computing device to return the executed document to the organization in the electronic form, the returning program marking the returning document with routing information.

9. The medium of claim 8 wherein the mail system is operated by a document processing business having the plurality of merchants as branches thereof.

10. The medium of claim 8 wherein the document is stored at the mail system according to a retrieval code, and wherein the organization supplies the retrieval code to the recipient, the recipient entering the supplied retrieval code at the computing device at the visited merchant to identify the document at the mail system and retrieve the document from the mail system.

11. The medium of claim 8 wherein the electronic executed document is received from the computing device at the visited merchant at a self-service kiosk that the recipient employs and that is dedicated to retrieving the document for the recipient and returning the electronic executed document to the organization.

12. The medium of claim 8 wherein the organization pays the visited merchant according to a predetermined arrangement therebetween for all services rendered to the recipient by the visited merchant in connection with the document.

13. The medium of claim 8 wherein the electronic executed document is received from the computing device by way of a returning program employed on the computing device to return the executed document to the organization in the electronic form, the returning program ensuring that the returning document is sent to the organization correctly and marking the returning document with information that allows the returned document to be routed correctly within the organization.

14. The medium of claim 8 wherein the electronic mail system includes a spooler where the document is spooled.

15. A system employed by an organization to expedite electronic delivery and return of a document, the system comprising:
a subsystem that sends a document to be received by a recipient to an electronic mail system, where the document as sent is stored in an electronic form;
a subsystem that informs the recipient that the document is available to the recipient at any of a plurality of merchants where the document may be retrieved; and
a subsystem that receives the document in an electronic form and in an executed form from the recipient upon the recipient visiting one of the plurality of merchants and at the visited merchant retrieving the document in the electronic form from the mail system to a computing device at the visited merchant, and reviewing and executing the document at the visited merchant, the executed document in an electronic form being received from the recipient by way of the visited merchant and the computing device thereat, wherein the electronic executed document is received from the computing device by way of a returning program employed on the computing device to return the executed document to the organization in the electronic form, the returning program marking the returning document with routing information.

16. The system of claim 15 wherein the mail system is operated by a document processing business having the plurality of merchants as branches thereof.

17. The system of claim 15 wherein the document is stored at the mail system according to a retrieval code, and wherein the organization supplies the retrieval code to the recipient, the recipient entering the supplied retrieval code at the computing device at the visited merchant to identify the document at the mail system and retrieve the document from the mail system.

18. The system of claim 15 wherein the electronic executed document is received from the computing device at the visited merchant at a self-service kiosk that the recipient employs and that is dedicated to retrieving the document for the recipient and returning the electronic executed document to the organization.

19. The system of claim 15 wherein the organization pays the visited merchant according to a predetermined arrangement therebetween for all services rendered to the recipient by the visited merchant in connection with the document.

20. The system of claim 15 wherein the electronic mail system includes a spooler where the document is spooled.

* * * * *